United States Patent
Sato

(10) Patent No.: US 7,217,449 B2
(45) Date of Patent: May 15, 2007

(54) PROTECTIVE LAYER THERMAL TRANSFERRING FILM

(75) Inventor: Yasuhiro Sato, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 11/236,512

(22) Filed: Sep. 28, 2005

(65) Prior Publication Data

US 2006/0068177 A1   Mar. 30, 2006

(30) Foreign Application Priority Data

Sep. 30, 2004   (JP)   ............... 2004-287505

(51) Int. Cl.
*B41M 5/40*   (2006.01)

(52) U.S. Cl. ............... 428/195.1; 428/32.6; 428/32.81; 503/227

(58) Field of Classification Search ................. 503/227
See application file for complete search history.

(56) References Cited

U.S. PATENT DOCUMENTS 6,638,635 B2 * 10/2003 Hattori et al. .............. 428/500

FOREIGN PATENT DOCUMENTS

| JP | 2000-71626 A | 3/2000 |
|---|---|---|
| JP | 2000-080844 A | 3/2000 |

* cited by examiner

*Primary Examiner*—Bruce H. Hess
(74) *Attorney, Agent, or Firm*—Birch, Stewart, Kolasch & Birch, LLP

(57) ABSTRACT

To provide a protective-layer thermal transferring film that can provide a protective layer having a superior sorting property.

A protective-layer thermal transferring film which has a protective layer that comprises at least a peeling layer and a heat seal layer on at least one portion of one face of a substrate film, and can be thermally transferred, and when the protective layer is thermally transferred on an image-receiving member, the image-receiving member is allowed to have a surface coefficient of friction of 0.4 or less.

3 Claims, 1 Drawing Sheet

PROTECTIVE LAYER THERMAL TRANSFERRING FILM

BACKGROUND OF THE INVENTION

1. Field of the Invention

This invention relates to a protective-layer thermal transferring film and a printed article having an image on which the protective layer of the film is transferred.

2. Description of the Related Art

Conventionally, images such as tone images and monotone images including characters and symbols have been formed on a substrate by using a thermal transfer system, such as a heat-sensitive sublimation transfer system.

In the heat-sensitive sublimation transfer system, a thermal transfer film, which is formed by placing a dye layer prepared by melting or dispersing a sublimable dye serving as a colorant in a binder resin on a substrate, is used, and with this thermal transfer film being superposed on an image receiving film, energy in accordance with image information is applied to a heating device such as a thermal head so that the sublimable dye contained in the dye layer on the thermal transfer film is transferred onto the image-receiving film; thus, an image is formed thereon.

This heat-sensitive sublimation transfer system makes it possible to control the amount of dye transfer on a dot basis in response to the quantity of energy to be applied to the thermal transfer film; therefore, this system has the advantages of forming a superior tone image and of easily forming characters, symbols and the like.

With respect to the image formed by the heat-sensitive sublimation transfer system, since the transferred dye is present on the surface of the image-receiving member, a protective layer is formed on the image from the viewpoints of protecting the image and of imparting light resistance, abrasion resistance and the like to the image (for example, see Patent Document 1 and Patent Document 2).

Printed articles, each having the protective layer formed thereon, are continuously discharged from a printer, and stacked on a printed-article receiving tray, and the printed articles, discharged on the tray, are not accurately stacked one by one on the printed article discharged immediately before, and randomly stacked to a certain extent. For this reason, after a desired number of sheets have been printed, the pile of the printed articles is taken out of the tray, and normally, these need to be sorted properly.

In this case, however, a problem tends to arise in which the printed articles, discharged from a printer, are mutually adhered to each other, with the result that the continuously printed articles are not properly aligned, that is, the printed articles are not properly sorted (poor sorting property).

[Patent Document 1] Japanese Patent Application Laid-Open No. 2000-80844
[Patent Document 2] Japanese Patent Application Laid-Open No. 2000-71626

BRIEF SUMMARY OF THE INVENTION

The present invention has been made to solve the above-mentioned problems, and its objective is to provide a protective-layer thermal transferring film which can provide a protective layer that is superior in sorting property.

The present invention relates to a protective-layer thermal transferring film comprising:

a protective layer that comprises at least a peeling layer and a heat seal layer, formed on at least one portion of one face of a substrate film, and is thermally transferred, wherein, when the protective layer is thermally transferred on an image-receiving member, the image-receiving member is allowed to have a surface coefficient of friction of 0.4 or less.

REFERENCE NUMERALS

Figure 1:
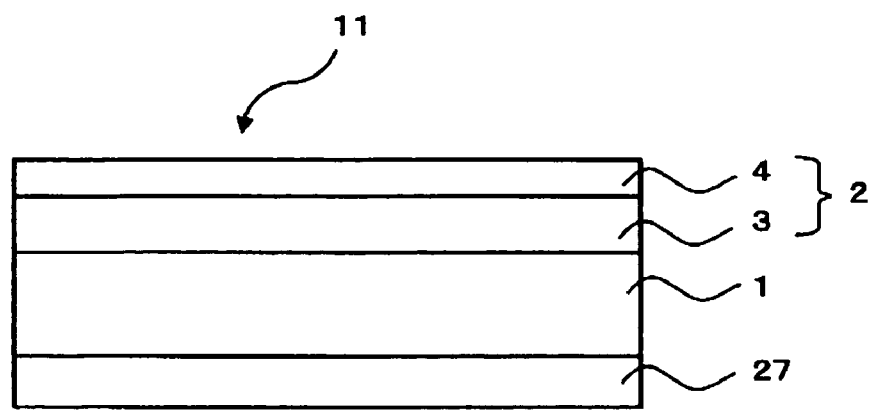
FIG. 1 is a schematic sectional view that shows one embodiment of a thermal transferring film of the present invention.

11, 21 Thermal transferring film
1, 22 Substrate film
2 Thermal transferring protective layer
3 Peeling layer
4 Heat seal layer
27 Back layer

DETAILED DESCRIPTION OF THE INVENTION

The present invention provides to a protective-layer thermal transferring film which has a protective layer comprising at least a peeling layer and a heat seal layer on at least one portion of one face of a substrate film, and can be thermally transferred, and when the protective layer is thermally transferred on an image-receiving member, the image-receiving member is allowed to have a surface coefficient of friction of 0.4 or less.

FIG. 1 is a schematic sectional view that shows one example of a protective-layer thermal transferring film. In this Figure, a protective-layer thermal transfer film 1 is provided with a protective layer 2 that is constituted by a peeling layer 3 and a heat seal layer 4, and formed on one of faces of a substrate film 1.

With respect to the substrate film 1, not particularly limited, the same substrate sheet as those widely used in this field may be used. Specific examples of the substrate film include polyesters having high heat resistance, such as polyethylene terephthalate, polyethylene naphthalate, polybutylene terephthalate, polyphenylene sulfide, polyether ketone and polyether sulfone; and plastic films, such as polypropylene, polycarbonate, cellulose acetate, derivatives of polyethylene, polyvinyl chloride, polyvinylidene chloride, polystyrene, polyamide, polyimide, polymethyl pentene and ionomer, and a laminated member and the like of these. The above-mentioned plastic film may be used as a drawn film, or may be used as an undrawn film. The thickness of the substrate film, which is properly selected by taking the strength, heat resistance and the like into consideration, is normally set in the range from 1 to 100 μM.

The peeling layer 3 is contains at least a binder resin and silicone oil or a modified silicone resin.

With respect to the binder resin, those known thermoplastic resins and thermosetting resins that have been used in the present field may be used.

With respect to the thermoplastic resin, examples thereof include acryl-based resins such as polymethacrylic acid, polymethacrylic amide, poly(methyl methacrylate), poly (ethyl methacrylate) and poly(butyl acrylate); vinyl-based resins such as poly(vinyl acetate), vinyl chloride-vinyl acetate copolymer, poly(vinyl alcohol) and poly(vinyl butyral); and cellulose derivatives, such as ethyl cellulose, nitrocellulose and cellulose acetate, and mixtures thereof.

With respect to the thermosetting resin, examples thereof include unsaturated polyester resins, polyester resins, polyurethane-based resins, amino alkyd resins, and mixtures thereof.

Among these binder resins used for forming the peeling layer 3, acryl-based resins are more preferably used.

With respect to the silicone oil, among those conventionally known ones, modified silicone oils, in particular, alcohol-modified silicone oils, polyether-modified silicone oils or epoxy-modified silicone oils, preferably, alcohol-modified silicone oils or polyether-modified silicone oils may be used.

The amount of addition of silicone oil to the peeling layer needs to be optimally set depending on the kinds of silicone oils, and is generally set in the range of 0.1 to 50 parts by weight, preferably 1 to 10 parts by weight, on its solid basis, with respect to 100 parts by weight of the peeling-layer constituent resin. When the amount of addition is too high, problems such as a failure in maintaining performances as the peeling layer tend to occur, while, when the amount of addition is too low, it becomes difficult to reduce the coefficient of friction as the protective layer.

With respect to commercially available silicone oil products applicable to the present invention, examples thereof include X-22-176DX (made by Shin-Etsu Chemical Co., Ltd.) and FZ222 (made by Nihonunica Corporation).

With respect to the silicone-modified resin, examples thereof include silicone butyral, silicone acryl, silicone graft acryl, silicone epoxy, silicone phenol, silicone polyester and silicone alkyd, and preferable examples include silicone-modified butyral and silicone graft acryl.

The amount of addition of silicone-modified resin to the peeling layer needs to be optimally set depending on the kinds of silicone-modified resins, and is generally set in the range of 0.1 to 100 parts by weight, preferably 10 to 100 parts by weight, on its solid basis, with respect to 100 parts by weight of the peeling-layer constituent resin. When the amount of addition is too high, problems such as a failure in maintaining performances as the peeling layer tend to occur. When the amount of addition is too low, it becomes difficult to reduce the coefficient of friction as the protective layer.

With respect to commercially available silicone-modified resin products applicable to the present invention, examples thereof include SP714 (made by Dainichiseika Color & Chemicals Mfg. Co., Ltd.) (silicone-modified butyral), X-22-8004, X-22-8005A, X-22-8195 (made by Shin-Etsu Silicone Chemical Co., Ltd.; silicone graft acryl), and FS710, FS731 (made by NOF Corporation; silicone graft acryl).

In the present invention, the peeling layer may contain an ultraviolet ray absorbing agent. The addition of the ultraviolet ray absorbing agent makes it possible to improve light resistance and weather resistance of images, etc. on the image-receiving member to be coated with the protective layer after the transferring process.

With respect to the ultraviolet ray absorbing agent, those conventionally known organic ultraviolet ray absorbing agents, such as salicylate-based agents, benzophenone-based agents, benzotriazole-based agents, substituted acrylonitrile-based agents, nickel chelate-based agents, and hindered amine-based agents, may be widely used. An ultraviolet ray absorbing resin, prepared by introducing an addition polymerizable double bond, such as a vinyl group, an acryloyl group and a methacryloyl group, or a functional group, such as an alcoholic hydroxide group, an amino group, a carboxylic group, an epoxy group and an isocyanate group, into each of these ultraviolet ray absorbing agents, may be contained in the peeling layer.

Various additives, such as an antioxidant and a fluorescent whitener, may be added to the peeling layer. The peeling layer is formed through processes in which ink, prepared by adding necessary additives such as wax to the binder resin and dissolving or dispersing the resulting mixture in a solvent such as water and an organic solvent, is applied to a substrate film by using a normal coating method such as a gravure printing method, a screen printing method and a reverse roll coating method using a gravure plate, and the coated substrate film is dried.

The thickness of the peeling layer is normally set in the range from 0.1 to 10 µm, preferably from 0.5 to 5 µm.

The heat seal layer is used for bonding the protective layer to an image surface. With respect to a resin forming this heat seal layer, any of conventionally known resins to which a sticker, a heat sensitive adhesive and the like are added may be used; and thermoplastic resins having a glass transition temperature (Tg) in the range from 50 to 80° C. are preferably used. Specific examples of such thermoplastic resins include polyester resin, vinyl chloride-vinyl acetate copolymer resin, acrylic resin, butyral resin, epoxy resin, polyamide resin and vinyl chloride resin. The heat seal layer may contain additives, such as an ultraviolet ray absorbing agent, an antioxidant and a fluorescent whitener. The heat seal layer may contain a filler such as micro-silica so as to improve the foil-separating property of the heat seal layer.

The heat seal layer is formed through processes in which a coating solution, prepared by dissolving or dispersing the resin and other additives in a solvent such as an organic solvent, is applied onto a peeling layer through a known coating method such as a wire-coating method so that the coated layer is cured and dried. The thickness of the heat seal layer is normally set in the range from 1 to 10 µm, preferably from 0.5 to 5 µm.

In the present invention, a release layer may be formed between the substrate film and the protective layer. In the case when the separating property between the substrate film and the protective layer is not appropriate, the release layer is formed, if necessary, so as to adjust the bonding property between the substrate film and the protective layer and also to carry out the peeling process of the protective layer desirably. When the release layer is prepared, the release layer is formed in such a manner that, after the protective layer has been separated from the protective layer through a transferring process, the releasing layer itself is allowed to remain on the substrate film side.

The release layer is constituted by, for example, various waxes such as silicone wax or silicone oil, and various resins such as silicone resin, fluorine resin, (meth)acrylic resin (which is used as a term including both of acrylic resins and methacrylic resins), silicone-modified (meth)acrylic resin, water soluble resin, cellulose derivative resin, urethane-based resin, acetic acid-based vinyl resin, acrylic vinyl ether-based resin and maleic anhydride resin, and mixtures thereof.

The release layer may contain additives such as a curing agent and an ultraviolet ray absorbing agent, and the release layer is formed through processes in which a coating solution containing at least one material selected from the group consisting of the above-mentioned waxes and resins, with additives contained therein, if necessary, is applied to a substrate film by using a conventionally known coating method such as a wire-coating method and the resulting coated layer is cured, if necessary, and dried. The thickness of the release layer is normally set in the range from 0.5 to 5.0 µm.

In the present invention, a back layer may be formed on the other face of the substrate film. The back layer is formed so as to prevent heat seal between a heating device such as a thermal head and the substrate film 2 and provide a smooth traveling operation. With respect to the resin to be used for this back layer, examples thereof include cellulose-based resins, such as ethyl cellulose, hydroxy cellulose, hydroxypropyl cellulose, methyl cellulose, cellulose acetate, cellulose butyrate, nitrocellulose; vinyl-based resins, such as poly(vinyl alcohol), poly(vinyl acetate), poly(vinyl butyral), poly(vinyl acetal) and poly(vinyl pyrrolidone); acrylic resins, such as poly(methyl methacrylate), poly(ethyl acrylate), polyacrylamide and acrylonitrile-styrene copolymer; polyamide resin; polyvinyl toluene resin; coumarone indene resin; polyester resin; polyurethane resin; and a single substance or a mixture of natural or synthetic resins, such as silicone-modified or fluorine-modified urethane. In order to further improve the heat resistance of the back layer, among the above-mentioned resins, a resin having a hydroxide-group-based reactive group (for example, butyral resin, acetal resin and the like) is used while polyisocyanate or the like is used in combination as a crosslinking agent; thus, a crosslinked resin layer is preferably used as the back layer.

In order to impart a sliding property with the thermal head, a solid-state or liquid-state release agent or lubricant may be added to the back layer so as to provide a heat-resistant lubricating property. With respect to the release agent or lubricant, examples thereof include various waxes such as polyethylene wax and paraffin wax; various surfactants, such as higher fatty alcohol, organopolysiloxane, anionic surfactants, cationic surfactants, amphoteric surfactants, nonionic surfactants and fluorine-based surfactants; organic carboxylic acid and derivatives thereof, fluorine-based resins, silicone-based resins, fine particles of inorganic compounds, such as talc and silica. The amount of lubricant to be contained in the back layer is set in the range from 5 to 50% by weight, preferably from 10 to 30% by weight, in the back surface.

The back layer is formed through processes in which a coating solution, prepared by dissolving or dispersing the resin and the other additives in a solvent such as water and an organic solvent, is applied to a substrate film by using a normal coating method such as a wire-coating method, and the resulting layer is dried. The thickness of the back layer is normally set in the range from 0.1 to 10 µm, more preferably, from 0.5 to 5 µm.

The protective-layer thermal transferring film of the present invention is not intended to be limited by the above-mentioned mode, and is desirably formed in accordance with the intended purpose as a film such as a composite protective-layer thermal transferring film with a thermally transferring protective layer and a heat sublimabile color material layer, and a composite protective-layer thermal transferring film with a thermally transferring protective layer and a heat meltable color material layer. In the case of the former composite protective-layer thermal transferring film, as long as the image-receiving member has a receiving layer for dyes, an image-forming process through a thermal transfer system and a transferring process of the protective layer to the image-receiving member are simultaneously carried out.

With respect to another example of the protective-layer thermal transferring film, a protective-layer thermal transferring film in which a thermal transferring protective layer and at least one color material layer selected from the group consisting of a heat sublimabile color material layer and a heat meltable color material layer are formed on one of surfaces of a substrate film in a face-sequential manner may be used.

Figure 2:
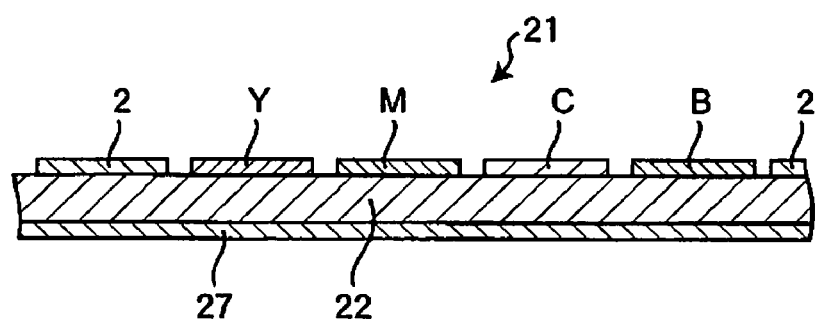
FIG. 2 is a schematic sectional view that shows another embodiment of a thermal transferring film of the present invention.

FIG. 2 is a schematic sectional view that shows another example of the protective-layer thermal transferring film of the present invention. In FIG. 2, a protective-layer thermal transferring film 21 of the present invention is constituted by a heat sublimable color material layer Y, a heat sublimable color material layer M, a heat sublimable color material layer C, a heat sublimable color material layer B and a thermal transferring protective layer that are formed on one of the faces of a substrate film 22 in a face-sequential manner, with a back layer 27 being formed on the other face of the substrate film 22. The thermal transferring protective layer is constituted by the protective layer 2 that has been explained above.

The heat sublimable color material layers Y, M, C and B, shown in FIG. 2, may be replaced by heat meltable color material layers Y, M, C and B, or a mixed structure of these layers may be used.

With respect to the image-receiving member on which the protective layer is transferred by using the protective-layer thermal transferring film of the present invention, not particularly limited, any material may be used.

Examples of the image-receiving member include films formed by any substrate, such as plain paper, wood free paper, tracing paper and a plastic film. The image-receiving member may have any one of forms including a card, a post card, a passport, letter paper, report paper, a notebook and a catalogue.

Specific examples of the image-receiving member of the present invention include premium tickets, such as share certificates, bonds, certificates, passbooks, train tickets, bicycle or horse race tickets, stamps, postal stamps, theater tickets, entrance tickets and other tickets; various cards, such as cash cards, credit cards, prepaid cards, members cards, greeting cards, post cards, name cards, driver's licenses, IC cards and optical cards; cases such as cartons and containers; bags; forms, envelopes, tags, OHP sheets, slide films, bookmarks, calendars, posters, pamphlets, menus, passports, POP articles, coasters, displays, name plates, keyboards, cosmetics, ornaments, such as wristwatches and lighters; stationary such as writing materials and report paper; building materials, panels, emblems, keys, cloths, clothing, footwear, apparatuses such as radios, televisions, electronic calculators and OA devices, various sample catalogues, albums, outputs from computer graphics, medical image outputs, and the like.

The image on the image-receiving member may be formed through any one of the systems, such as an electrophotographic system, an ink-jet recording system and a thermal transfer recording system.

Upon using the protective-layer thermal transferring film of the present invention, any one of conventionally known application methods of the protective-layer thermal transferring film, as it is, may be used. For example, the protective layer surface of the protective-layer thermal transferring film of the present invention is superposed on the image-receiving member so that the thermal transferring resin layer is thermally transferred onto the image-receiving member.

The protective layer, transferred onto the image-receiving member, is allowed to give a surface coefficient of friction of 0.4 or less to the image-receiving member. In the present invention, the surface coefficient of friction refers to a value obtained by measuring the coefficient of friction between the mutual transfer-receiving members through the method of JIS K 7125 when the protective-layer thermal transferring film of the present invention has been thermally transferred and formed on each of the image-receiving members. The adjustment of the surface coefficient of friction is carried out by adding silicone oil or modified silicone resin to the peeling layer that forms the protective layer outermost surface after the transferring process. In this manner, by giving a surface coefficient of friction of 0.4 or less, preferably 0.3 or less, to the image-receiving member, it becomes possible to provide a good sorting property to the image-receiving member.

A back layer containing a filler such as micro-silica is formed on the image-receiving member on the face opposite to the image-forming face of the image-receiving member so as to provide a transferring property inside the printer, and by transferring the protective layer of the present invention thereon, even when printed articles are continuously superposed one after another, it becomes possible to prevent the printed articles from adhering to each other and consequently to provide a good sorting property.

EXAMPLES

The following description will discuss the present invention by means of examples. In the following description, "parts" refer to "parts by weight", unless otherwise indicated.

Preparation Example 1

A heat-resistant slip layer, which had the following composition, was preliminarily applied onto one surface of a polyethylene terephthalate film (trade name 5AF48, made by Toray Co., Ltd.) having 4.5 μm in thickness by using a gravure coating method, and dried thereon with an amount of coat of 1.0 g/m² in the dried state, and the resulting layer was used.

(Heat-resistant Slip Layer Composition Solution)

| | |
|---|---|
| Polyvinyl butyral resin (S-LEC BX-1, made by Sekisui Chemical Co., Ltd.) | 13.6 parts |
| Polyisocyanate curing agent (Takenate D218, made by Takeda Pharmaceutical Co., Ltd.) | 0.6 parts |
| Phosphate ester (Plysurf A208S, made by Dai-ichi Kogyo Seiyaku Co., Ltd.) | 0.8 parts |
| MEK | 42.5 parts |
| Toluene | 42.5 parts |

(Formation of Peeling Layer)

A coating solution for a peeling layer, which had the following composition, was applied to the face opposite to the printed face of the heat-resistant slip layer by using a gravure coating method with an amount of coat of 1.0 g/m² in the dried state, and the coated film was dried for one minute at 110° C. in an oven.

(Coating Solution for Peeling Layer)

| | |
|---|---|
| Polymethylmethacrylate resin (Dianal BR-87, made by Mitsubishi Rayon Co., Ltd.) | 100 parts |
| Polyester resin (Vylon 200, made by Toyobo Co., Ltd.) | 0.1 parts |
| Alcohol-modified silicone oil (X-22-176DX,made by Shin-Etsu Chemical Co., Ltd.) | 10 parts |
| Ultraviolet-ray absorbing agent (Uvitex OB, made by Ciba Specialty ChemicalsCo., Ltd.) | 0.3 parts |
| Toluene | 100 parts |
| MEK | 100 parts |

(Formation of Heat Seal Layer)

An adhesive coating solution, which had the following composition, was applied onto the release layer by using a gravure coating method with an amount of coat of 1.2 g/m² in the dried state, and the coated film was dried for one minute at 110° C. in an oven. Thus, a protective-layer thermal transferring film was prepared.

(Coating Solution for Heat Seal Layer)

| | |
|---|---|
| Polyester resin (Vylon 200, made by Toyobo Co., Ltd.) | 19 parts |
| Silica (Sylysia 310P, made by Fuji Silysia Chemical Ltd.) | 0.5 parts |
| Polymer-type ultraviolet-ray absorbing agent (PUVA 50M-40TM, made by Ohtsuka Chemical Co., Ltd.) | 12 parts |
| Ultraviolet-ray absorbing agent (TINUVIN900, made by Ciba Specialties Chemicals Co., Ltd.) | 2.4 parts |
| Toluene | 19 parts |
| MEK | 19 parts |

(Preparation Examples 2 to 25, Comparative Example 1)

The same processes as those of Example 1 were carried out except that, in place of the alcohol-modified silicone resin used as the coating solution for a pealing layer in Preparation Example 1, silicone resins and amounts thereof described in the following Table 1 were used so that protective layer thermal transferring films were formed.

In Comparative Example 1, no silicone resin was added.

TABLE 1

(Evaluation Results)

| | Modified silicone oil or silicone modified resin | Loadings* (parts by weight) | Friction coefficient | Sorting property |
|---|---|---|---|---|
| Preparation Example 1 | alcohol modified silicone oil (X-22-176DX, Shin-Etsu Chemical, solids of 100%) | 10 | 0.14 | ○ |
| Preparation Example 2 | | 5 | 0.13 | ○ |
| Preparation Example 3 | | 3 | 0.13 | ○ |
| Preparation Example 4 | | 1 | 0.24 | ○ |

TABLE 1-continued (Evaluation Results)

| | Modified silicone oil or silicone modified resin | Loadings* (parts by weight) | Friction coefficient | Sorting property |
|---|---|---|---|---|
| Preparation Example 5 | | 0.5 | 0.44 | x |
| Preparation Example 6 | polyether modified silicone oil (FZ2222, Nihon unica, solids of 100%) | 10 | 0.07 | ○ |
| Preparation Example 7 | | 5 | 0.15 | ○ |
| Preparation Example 8 | | 3 | 0.19 | ○ |
| Preparation Example 9 | | 1 | 0.31 | Δ |
| Preparation Example 10 | | 0.5 | 0.45 | x |
| Preparation Example 11 | polyether modified silicone oil (X-22-6226, Shin-Etsu Chemical, solids of 100%) | 10 | 0.24 | ○ |
| Preparation Example 12 | | 5 | 0.40 | Δ |
| Preparation Example 13 | | 0.5 | 0.47 | x |
| Preparation Example 14 | silicone modified butyral (SP712, Dainichiseika, solids of 12.5%) | 50 | 0.18 | ○ |
| Preparation Example 15 | | 30 | 0.17 | ○ |
| Preparation Example 16 | | 10 | 0.37 | Δ |
| Preparation Example 17 | silicone graft acryl (X-22-8004, Shin-Etsu Chemical, solids of 40%) | 5 | 0.48 | x |
| Preparation Example 18 | silicone graft acryl (X-22-8005A, Shin-Etsu Chemical, solids of 50%) | 5 | 0.47 | x |
| Preparation Example 19 | silicone graft acryl (X-22-8195, Shin-Etsu Chemical, solids of 30%) | 5 | 0.44 | x |
| Preparation Example 20 | | 10 | 0.29 | ○ |
| Preparation Example 21 | silicone graft acryl (FS710, NOF Corporation, solids of 22%) | 5 | 0.46 | x |
| Preparation Example 22 | | 0.5 | 0.50 | x |
| Preparation Example 23 | silicone graft acryl (FS731, NOF Corporation, solids of 30%) | 10 | 0.25 | ○ |
| Preparation Example 24 | | 5 | 0.42 | x |
| Preparation Example 25 | | 0.5 | 0.51 | x |
| Comparative Example 1 | none | 0 | 0.47 | x |

*Parts by weight of solids of modified silicone oil or silicone modified resin added to 100 parts by weight of constituent resin for peeling layer.

(Preparation of Image-receiving Sheets for Use in Evaluation)

After an intermediate layer and a receiving layer, which had the following compositions, had been successively applied on a micro-void film having a thickness of 39 μm, and dried thereon, a bonding agent having the following composition was applied to the surface opposite to the face bearing the receiving layer, and dried thereon. The amounts of coat of the respective layers were 2 g/m² in the intermediate layer, 4 g/m² in the receiving layer and 4 g/m² in the bonding agent layer in the dried state.

Next, coat paper (186.1 g/m²) bearing HDPE/PP (total thickness: 33 μm) on its one surface, laminated as a curl-preventive layer, was prepared, and the bonding agent layer was bonded to the surface on the side laminating no HDPE/PP so that a roll-shaped thermal transferring image-receiving sheet was formed. A writing layer having the following composition was applied to the curl-preventive layer of this roll-shaped thermal transferring image-receiving sheet with an amount of coat in the range from 1.5 to 2.0 g/cm² in the dried state.

(Intermediate Layer Coating Solution)

| | |
|---|---|
| Polyester resin (WR-905, made by Nippon Synthetic Chemical Industry Co., Ltd.) | 13.1 parts |
| Titanium oxide (TCA 888, made by Tochem Products Co., Ltd.) | 26.2 parts |
| Fluorescent whitener (Uvitex BAC, made by Ciba Specialty Chemicals Co., Ltd.) | 0.39 parts |
| Water | 60.0 parts |
| Water/IPA = 1/1 | 32.0 parts |

(Receiving Layer Coating Solution)

| | |
|---|---|
| Vinyl chloride-vinyl acetate copolymer (Denka Vinyl #1000A, made by Denki Kagaku Kogyo K.K.) | 12.0 parts |
| Epoxy-modified silicone (X-22-3000T, made by Shin-Etsu Chemical Co., Ltd.) | 0.8 parts |

-continued

| | |
|---|---|
| Amino-modified silicone (X-22-1660B-3, made by Shin-Etsu Chemical Co., Ltd.) | 0.24 part |
| Toluene/MEK = 1/1 | 60.0 parts |

(Bonding Agent Layer Coating Solution)

| | |
|---|---|
| Polyfunctional polyol (Takelac A-969V, made by Mitsui Takeda Chemicals, Inc.) | 30 parts |
| Isocyanate (Takenate A-5, made by Mitsui Takeda Chemicals, Inc.) | 10 parts |
| Etyl acetate | 60 parts |

(Writing Layer Coating Solution)

| | |
|---|---|
| Polyvinyl butyral (#3000-1, made by Denki Kagaku Kogyo K.K.) | 30 parts |
| Nylon filler (MW-330, Shinto Fine Company, Ltd.) | 5 parts |
| Silica (Sylycia 250, made by Fuji Silysia Chemical Ltd.) | 60 parts |
| Chelate agent (Orgatics TC-750, made by Matsumoto Chemical Industry Co., Ltd.) | 5 parts |
| Toluene/MEK =1/1 | 400 parts |

Sorting Property

Each of protective-layer thermal transferring films obtained in the above-mentioned respective examples of preparation was cut and pasted onto a protective-layer thermal transferring film portion of a thermal transferring film exclusively used for a MEGAPIXEL-II (made by Altech Co., Ltd.) to prepare each of the above-mentioned image-receiving sheets for use in evaluation, and by using each of the image-receiving sheets for use in evaluation, a protective layer was formed on a solid black image printed by the sublimation printer MEGAPIXEL-II (made by Altech Co., Ltd.). Continuous 10 sheets of printed articles, each having the protective layer on its surface, were formed and stacked naturally on one after another. The printed articles thus stacked were taken out of the tray, and the printed articles were sorted. At this time, the "sorting property" was evaluated based upon the following criteria and ranked. Table 1 collectively shows the results.

◯: All the printed articles were easily sorted without resistance.

Δ: The printed articles were sorted by slightly applying a load to the printed articles.

×: Since the printed articles adhered to each other, it was not possible to sort the printed articles.

(Measurements on Coefficient of Friction)

The coefficient of friction between the printed articles (transfer-receiving members) formed under the above-mentioned conditions was measured with the opposite surface of printed article superposed on the surface of the printed article by using the method of JIS K 7125.

What is claimed is:

1. A protective-layer thermal transferring film, comprising:
    a protective layer that comprises at least a peeling layer and a heat seal layer,
    wherein the protective layer is formed on at least one portion of one face of a substrate film, and
    wherein the protective layer is thermally transferred, and
    wherein, the peeling layer comprises:
        a binder resin, and
        an alcohol-modified silicone oil, and
    wherein the silicone oil is present in an amount of 1 to 10 parts by weight, based on solid silicone oil, with respect to 100 parts by weight of the binder resin, and
    wherein the protective layer is thermally transferred on an image-receiving member, and
    wherein the image-receiving member has a surface coefficient of friction of 0.4 or less.

2. A protective-layer thermal transferring film, comprising:
    a protective layer that comprises at least a peeling layer and a heat seal layer,
    wherein the protective layer is formed on at least one portion of one face of a substrate film, and
    wherein the protective layer is thermally transferred, and
    wherein the peeling layer comprises:
        at least a binder resin, and
        a modified silicone resin selected from the group consisting of silicone butyral, silicone graft acryl and silicone phenol, and
    wherein said silicone resin is present in the amount of 10 to 100 parts by weight, based on solid silicone, with respect to 100 parts by weight of the binder resin, and
    wherein the protective layer is thermally transferred on an image-receiving member, and
    wherein the image-receiving member has a surface coefficient of friction of 0.4 or less.

3. A printed article comprising the protective layer according to any one of claims 1 or 2.

* * * * *